US012608911B2

(12) United States Patent
Fangous et al.

(10) Patent No.: US 12,608,911 B2
(45) Date of Patent: Apr. 21, 2026

(54) METHODS FOR PROVIDING ARTIFICIAL INTELLIGENCE BASED WASTE MANAGEMENT AND DEVICES THEREOF

(71) Applicant: Jones Lang LaSalle IP, Inc., Chicago, IL (US)

(72) Inventors: Jean-Maxime Fangous, CWB (HK); McKinley Parker, Basking Ridge, NJ (US); Koon Chuen Lo, Happy Valley (HK); Wei Zhu, KLN (HK); Chiu Suiwing, KLN (HK); Nikhil Thapa, Yuen Long (HK)

(73) Assignee: JONES LANG LASALLE IP, INC., Chicago, IL (US)

( * ) Notice: Subject to any disclaimer, the term of this patent is extended or adjusted under 35 U.S.C. 154(b) by 483 days.

(21) Appl. No.: 17/961,937

(22) Filed: Oct. 7, 2022

(65) Prior Publication Data

US 2024/0119703 A1     Apr. 11, 2024

(51) Int. Cl.
*G06V 10/764* (2022.01)
*B65F 1/14* (2006.01)
*G06Q 10/30* (2023.01)
*G06V 10/774* (2022.01)

(52) U.S. Cl.
CPC .......... *G06V 10/764* (2022.01); *B65F 1/1484* (2013.01); *G06Q 10/30* (2013.01); *G06V 10/774* (2022.01); *B65F 2210/138* (2013.01); *B65F 2210/168* (2013.01); *B65F 2210/182* (2013.01)

(58) Field of Classification Search
CPC .... G06V 10/764; G06V 10/774; G06V 10/50; G06V 20/52; B65F 1/1484; B65F 2210/138; B65F 2210/168; B65F 2210/182; B65F 2210/128; B65F 2210/1443; G06Q 10/30
See application file for complete search history.

(56) References Cited

U.S. PATENT DOCUMENTS

2016/0379154 A1* 12/2016 Rodoni .......... G06Q 10/063114
                                                          705/7.15
2021/0188541 A1*  6/2021 Kurani ................... G06Q 10/08
2023/0011326 A1*  1/2023 Abbondanzio ........ G06Q 10/00

* cited by examiner

*Primary Examiner* — Emily C Terrell
*Assistant Examiner* — Amanda H Pearson
(74) *Attorney, Agent, or Firm* — Troutman Pepper Locke LLP

(57) ABSTRACT

Methods, non-transitory computer readable media, and waste collection apparatuses are disclosed that provide artificial intelligence based waste management and optimized waste collection scheduling. In some examples, an artificial intelligence model can be used to classify images of waste and determine whether a correct waste type is deposited in a collection bin. In other examples, utilization data is periodically received via communication network(s) from a waste collection device within a collection area. The utilization data is determined from sensor data obtained at the waste collection device. A waste collection schedule is determined for the waste collection device based on the utilization data for the waste collection device and stored historical utilization data for other waste collection device(s) within the collection area. The determined waste collection schedule is then provided to an operational management device via other communication network(s) to facilitate more efficient waste collection for the collection area.

18 Claims, 8 Drawing Sheets

Obtain training data 305

Filter the obtained training data 310

Convert the filtered data to a standard format 315

Train the AI model using the converted filtered data 320

Store the trained AI model 325

END 330

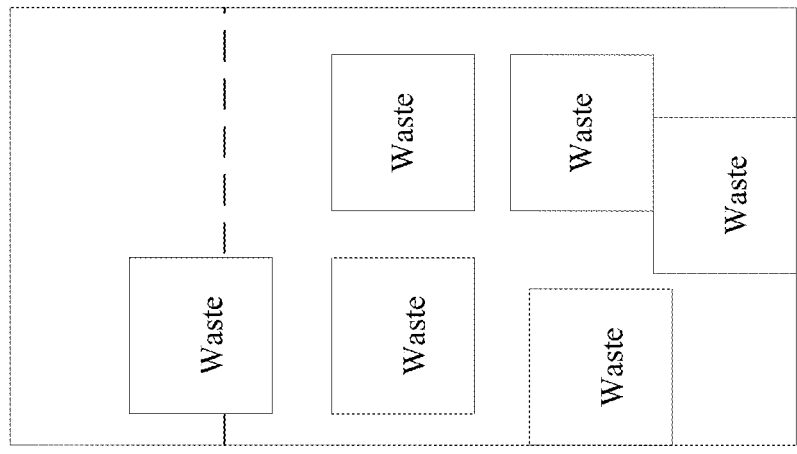
Waste collection device 12(1)
above the threshold
FIG. 6
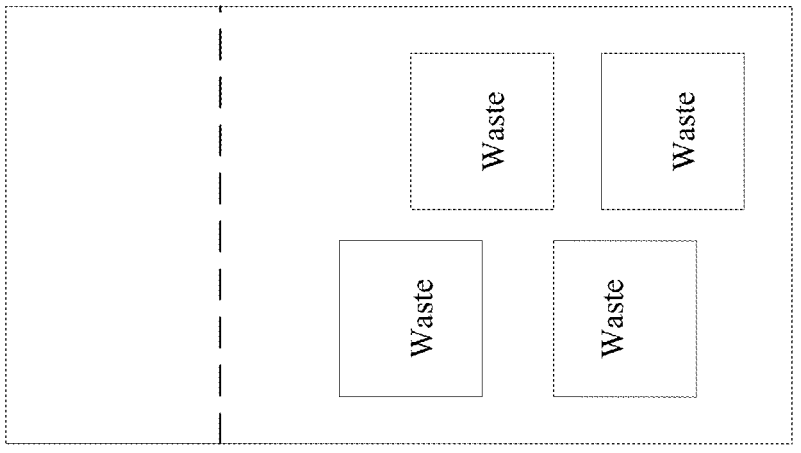
Waste collection device 12(1)
below the threshold

METHODS FOR PROVIDING ARTIFICIAL INTELLIGENCE BASED WASTE MANAGEMENT AND DEVICES THEREOF

FIELD

This technology generally relates to waste management and, more particularly, to methods for providing artificial intelligence based waste management and devices thereof.

BACKGROUND

In areas of higher density population, such as residential/office, retail and entertainment precincts, municipal organizations, collection bins are provided for disposal of garbage and recyclable waste. Traditionally, collection bins are fixed in location and emptied on a regular basis, which depends on the extent of use of the collection bins, but is typically based on a weekly or daily schedule. However each collection bin in an area will be used in differing amounts depending on the location of the collection bin within the collection area and other factors.

Aside from one-off collections during or after a special event at a specific location, the timing of collection from the collection bins, generally, does not vary. As a result, the frequency of collection is usually sub-optimal and does not account for the waste level in each individual collection bin, which can result in collection bins that are not full being emptied unnecessarily or overfilled collection bins. Additionally, collection bins are often utilized incorrectly such that unrecyclable materials are deposited in recycle collection bins, for example, resulting in downstream inefficiencies and other issues.

SUMMARY

A method is disclosed that includes periodically receiving, by a waste management apparatus and via one or more communication networks, utilization data from a waste collection device within a collection area. The utilization data is determined from sensor data obtained at the waste collection device. A waste collection schedule is then determined, by the waste management apparatus, for the waste collection device based on the utilization data for the waste collection device and stored historical utilization data for one or more other waste collection devices within the collection area. The determined waste collection schedule is provided, by the waste management apparatus, to an operational management device or a collection service device via another one or more communication networks to facilitate more efficient waste collection for the collection area.

A non-transitory computer readable medium is also disclosed that has stored thereon instructions including executable code that, when executed by at least one processor, causes the processor to periodically receive, via one or more communication networks, utilization data from a waste collection device within a collection area. The utilization data is determined from sensor data obtained at the waste collection device. A waste collection schedule is then determined for the waste collection device based on the utilization data for the waste collection device and stored historical utilization data for one or more other waste collection devices within the collection area. The determined waste collection schedule is provided to an operational management device or a collection service device via another one or more communication networks to facilitate more efficient waste collection for the collection area.

Additionally, a waste collection apparatus is disclosed that includes a memory having programmed instructions stored thereon and a processor coupled to the memory and configured to execute the stored programmed instructions to periodically receive, via one or more communication networks, utilization data from a waste collection device within a collection area. The utilization data is determined from sensor data obtained at the waste collection device. A waste collection schedule is then determined for the waste collection device based on the utilization data for the waste collection device and stored historical utilization data for one or more other waste collection devices within the collection area. The determined waste collection schedule is provided to an operational management device or a collection service device via another one or more communication networks to facilitate more efficient waste collection for the collection area.

This technology provides a number of advantages including methods, non-transitory computer readable media, and waste collection apparatuses that effectively utilize artificial intelligence based waste management via image classification to ensure waste of a correct type is deposited in a corresponding collection bin. The technology described and illustrated herein provides smart waste management systems that accurately estimate utilization levels for collection bins in a collection area over time and generates optimized waste collection schedules Furthermore, the disclosed technology generates and provides timely notifications to operational management devices, which can assist with emptying the waste collection devices prior to overfilling.

BRIEF DESCRIPTION OF THE DRAWINGS

FIG. 6 is a block diagram of an exemplary waste collection device;

DETAILED DESCRIPTION

Figure 1:
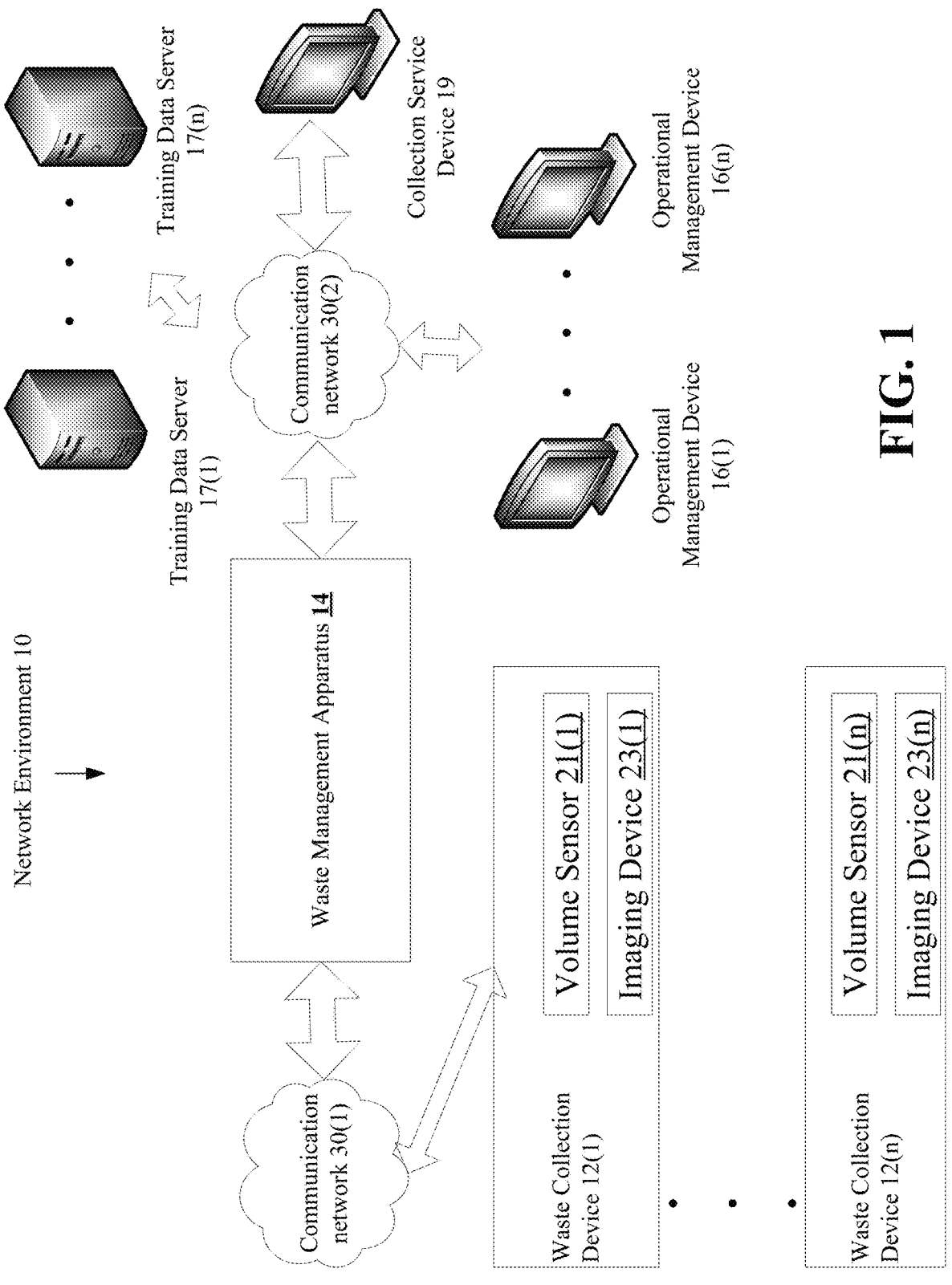
FIG. 1 is an example of a block diagram of a network environment that includes a waste management apparatus.

An environment 10 with an example of a waste management apparatus 14 is illustrated in FIG. 1. In this particular example, the environment 10 includes the waste management apparatus 14, waste collection devices 12(1)-12(n), operational management devices 16(1)-16(n), training data servers 17(1)-17(n), and a collection service device 19 coupled via one or more communication networks 30(1)-30(2), although the environment 10 could include other types and numbers of systems, devices, components, and/or other elements as is generally known in the art and will not be illustrated or described herein. This technology provides a number of advantages including improved, artificial intelligence based waste management.

The technology disclosed herein uses collection bins with sensors and/or cameras that are trained to detect the type and the amount of deposited waste (e.g., garbage or recyclable material). Further, the trained smart collection bins are then used to accurately track the amount of disposed waste to more effectively generated collection schedules, that can include collection timing and/or routes. Based on the amount of garbage that is disposed into the trash can, the disclosed technology provides an accurate estimate of when the garbage can would be full and accordingly send out notifications to empty the trash cans by also considering the operational delays.

Figure 2:
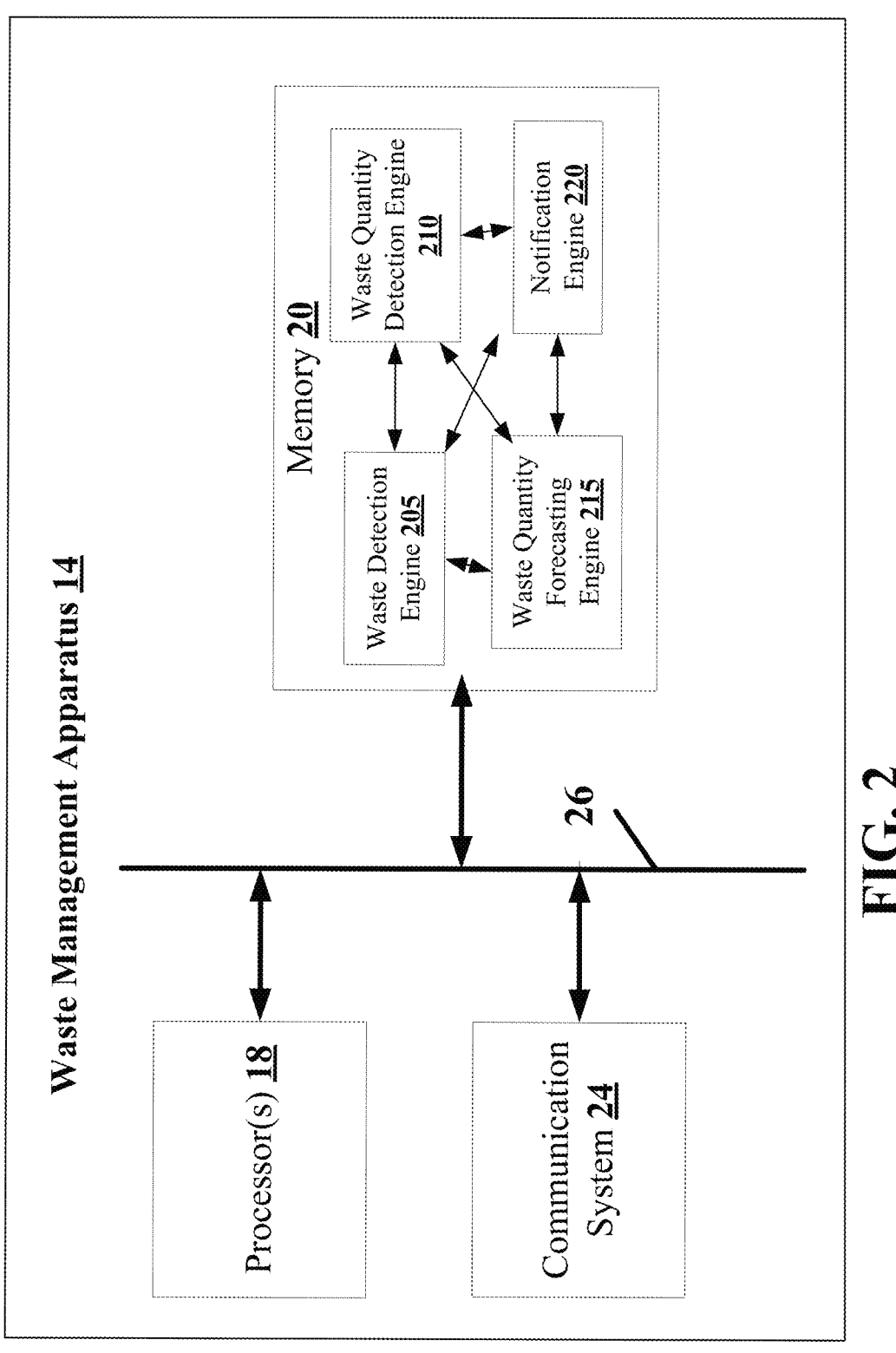
FIG. 2 is a block diagram of an exemplary waste management apparatus.

Referring more specifically to FIGS. 1-2, the waste management apparatus 14 is programmed to provide artificial intelligence based waste management; although the apparatus can perform other types and/or numbers of functions or other operations and this technology can be utilized with other types of claims. In this particular example, the waste management apparatus 14 includes a processor 18, a memory 20, and a communication system 24, which are coupled together by a bus 26, although the waste management apparatus 14 may comprise other types and/or numbers of physical and/or virtual systems, devices, components, and/or other elements in other configurations.

The processor 18 in the waste management apparatus 14 may execute one or more programmed instructions stored in the memory 20 for providing artificial intelligence based waste management as illustrated and described in the examples herein, although other types and numbers of functions and/or other operations can be performed. The processor 18 in the waste management apparatus 14 may include one or more central processing units and/or general purpose processors with one or more processing cores, for example.

The memory 20 in the waste management apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM), solid state disks, or other computer readable medium which is read from and written to by a magnetic, optical, or other reading and writing system that is coupled to the processor 18, can be used for the memory 20.

As illustrated in FIG. 2, the memory 20 within the waste management apparatus 14 includes a waste detection engine 205, waste quantity detection engine 210, waste quantity forecasting engine 215, and a notification engine 220, although the memory 20 within the waste management apparatus 14 can include other types of engines or modules. In this example, the waste detection engine 205 is configured to communicate with the waste collection devices 12(1)-12(n) via the communication network 30(1) to identity a type of waste that is being collected in the waste collection devices 12(1)-12(n), although the waste detection engine 205 can be configured to perform other types functions.

The memory 20 within the waste management apparatus 14 also includes a waste quantity detection engine 210 that is configured to communicate with the waste collection devices 12(1)-12(n) to identify the quantity of waste that is being collected at the waste collection devices 12(1)-12(n). Although, the waste quantity detection engine 210 can be configured to perform other types of functions in other examples.

Furthermore, the memory 20 within waste management apparatus 14 includes a waste quantity forecasting engine 215 that is configured to forecast the duration within which the waste collection devices 12(1)-12(n) can achieve maximum capacity to accept waste, although the waste quantity forecasting engine 215 can be configured to perform other types or amounts of functions. Additionally, the memory 20 within the waste management apparatus 14 includes a notification engine 220 that is configured to provide notification to operational management devices 16(1)-16(n) and/or the collection service device 19 to empty the waste collected in the waste collection devices 12(1)-12(n), although the notification engine 220 can be configured to perform other types or amounts of functions.

The communication system 24 in the waste management apparatus 14 operatively couples and communicates between one or more of the waste collection devices 12(1)-12(n), one or more of the operational management devices 16(1)-16(n), one or more training data servers 17(1)-17(n), and the collection service device 19, which are all coupled together by one or more of the communication networks 30(1)-30(2), although other types and numbers of communication networks or systems with other types and numbers of connections and configurations to other devices and elements. By way of example only, the communication networks 30(1)-30(2) can use TCP/IP over Ethernet and industry-standard protocols, including NFS, CIFS, SOAP, XML, LDAP, SCSI, and SNMP, although other types and numbers of communication networks, can be used. The communication networks 30(1)-30(2) in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the waste collection devices 12(1)-12(n) are configured to receive different types of wastes, although the waste. Each of the waste collection devices 12(1)-12(n) may include a processor, a memory, one or more cameras, one of the volume sensors 21(1)-21(n) (e.g., an ultrasonic sensor), one of the imaging devices 23(1)-23(n) (e.g., a camera), and a communication system by way of example only, which are coupled together by a bus or other link, although each may have other types and/or numbers of other systems, devices, components, and/or other elements. In this example, the cameras 23(1)-23(n) are configured to detect the type of the waste being collected using a trained artificial intelligence or machine learning model, although the cameras 23(1)-23(n) can be configured to perform other types of functions. Additionally, in this example, the sensors 21(1)-21(n) are configured to detect the amount of waste collected within the waste collection devices 12(1)-12(n), although the sensors can be configured to perform other types or amounts of functions.

The operational management devices 16(1)-16(n) and/or collection service device 19 may communicate with the waste management apparatus 14 via one or more of the communication networks 30(2), for example, although other types and/or numbers of storage media in other configurations could be used. In this example, the waste management apparatus 14 sends notification to the operational management devices 16(1)-16(n) and/or collection service device 19 to empty the waste from the waste collection devices 12(1)-

12(*n*) upon determining that the waste collection devices 12(1)-12(*n*) has reached the maximum capacity to collect waste.

The waste management apparatus 14 also provides the operational management devices 16(1)-16(*n*) and/or collection service device 19 with an optimized schedule for waste collection. In some examples, the operational management devices 16(1)-16(*n*) are disposed within a property or building collection area whereas the collection service device 19 is external to a property and can be associated with a physical neighborhood or district collection area, for example. In this particular example, each of the operational management devices 16(1)-16(*n*) and/or collection service device 19 may include a processor, a memory, and a communication interface, which are coupled together by a bus or other link, although each may have other types and/or numbers of other systems, devices, components, and/or other elements.

The training data servers 17(1)-17(*n*) may communicate with the waste management apparatus 14 via one or more of the communication networks 30(2), for example, although other types and/or numbers of storage media in other configurations could be used. In this example, the waste management apparatus 14 can obtain data required for training artificial intelligence model stored within the memory 20 to accurately detect the type of deposited waste. In this particular example, each of the training data servers 17(1)-17(*n*) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the training data servers 17(1)-17(*n*) and may transmit data in response to requests from the waste management apparatus 14. Each the training data servers 17(1)-17(*n*) may include a processor, a memory, and a communication interface, which are coupled together by a bus or other link, although each may have other types and/or numbers of other systems, devices, components, and/or other elements.

Although the exemplary network environment 10 with the waste management apparatus 14, the waste collection devices 12(1)-12(*n*), the operational management devices 16(1)-16(*n*), the training data servers 17(1)-17(*n*), the collection service device 19 and the communication networks 30(1)-30(2) are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium (e.g., the memory 20) having instructions stored thereon for one or more aspects of the present technology as described and illustrated by way of the examples herein, as described herein, which when executed by the processor (e.g., the processor 18), cause the processor to carry out the steps necessary to implement the methods of this technology as described and illustrated with the examples herein.

Figure 3:
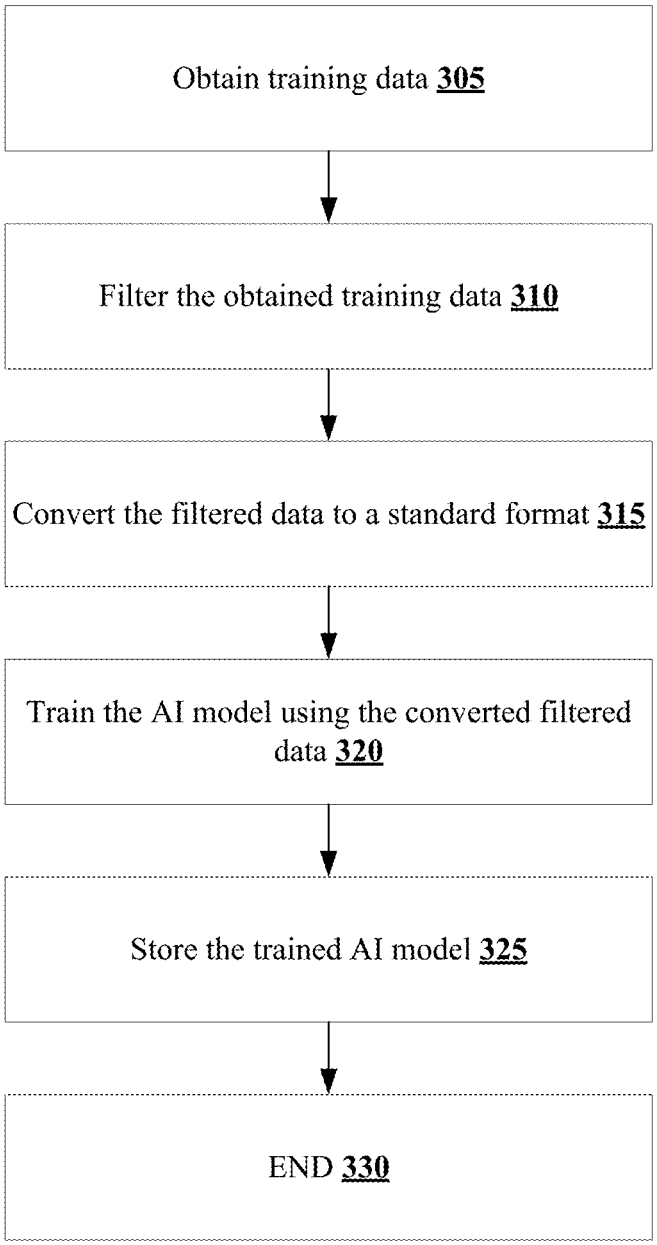
FIG. 3 is a flowchart of an exemplary method for training an artificial intelligence model to assist with waste management.
Figure 4:
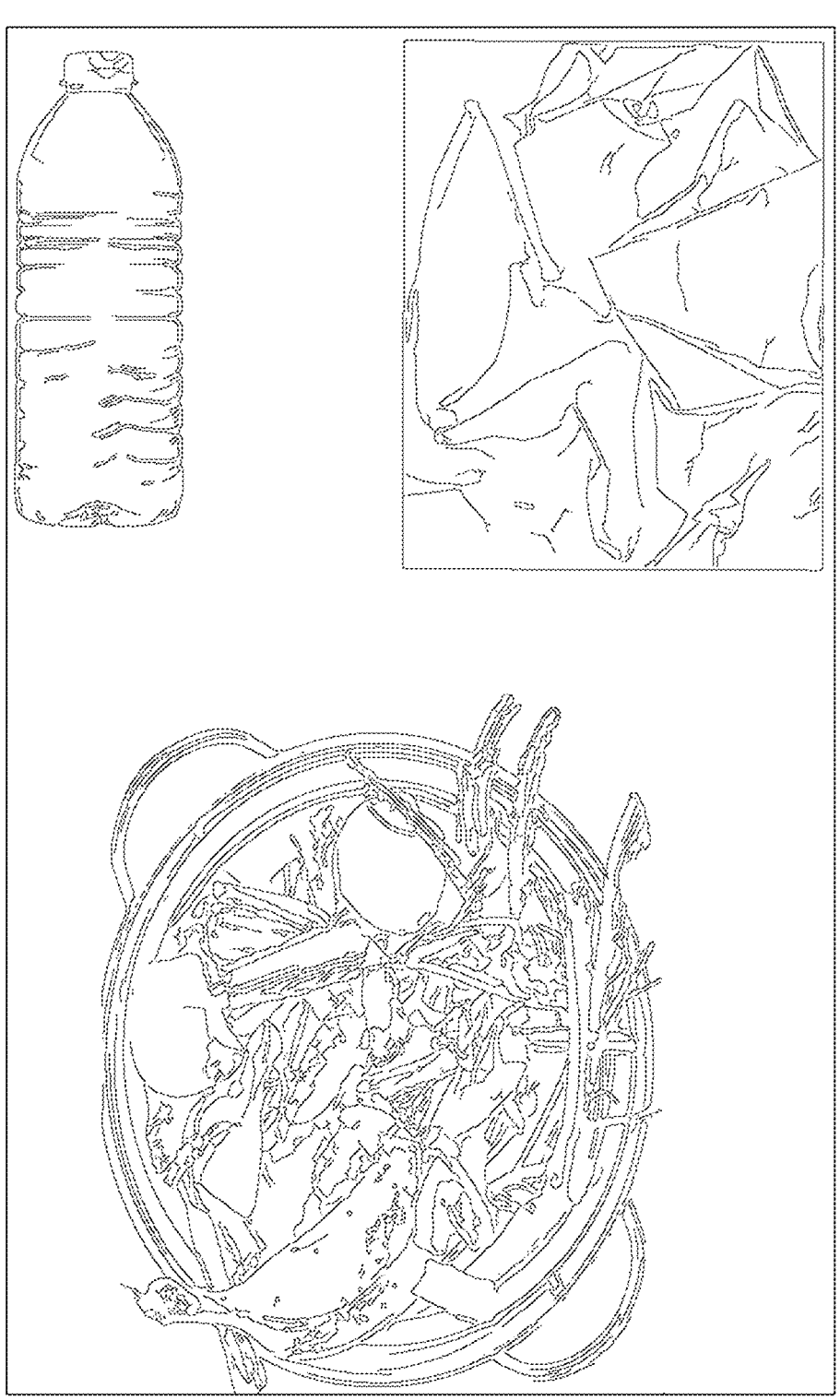
FIG. 4 is an exemplary image illustrating training data to train the artificial intelligence model.

An example of a method for training an artificial intelligence model to assist with waste management will now be described with reference to FIG. 3. The exemplary method begins at step 305 where the waste management apparatus 14 obtains training data from one of the training data servers 17(1)-17(*n*) to train the artificial intelligence model stored within the memory 20. In this example, the training data can include images of different types of waste that can be collected by the waste collection devices 12(1)-12(*n*), although the training data can include other types of content. An example of the training data includes the images illustrated in FIG. 4. For example, the training data that is obtained includes images of a plastic bottle, paper waste, and food waste, although the training data can include other types of content.

In step 310, the waste management apparatus 14 filters the obtained training data to remove images in the training data which may not include images of a required quality for training the artificial intelligence model, although the waste management apparatus 14 can perform other types of steps to improve the quality of the training data to train the artificial intelligence model.

Next in step 315, the waste management apparatus 14 converts the filtered data into a standard format that is suitable for training the artificial intelligence model stored within the memory 20. By way of example, the standard format can include converting the training data to a joint photographic experts group (JPEG) format, although the waste management apparatus 14 can convert the filtered data into other types of standard format for images.

In step 320, the waste management apparatus 14 trains the artificial intelligence model using the filtered data in standard format. In this example, training the artificial intelligence model involves associating the training images in a standard format with their corresponding description, although training the artificial intelligence model can include other types of numbers of different functions. By way of example, the artificial intelligence model within the memory 20 of the waste management apparatus 14 is trained to identify the image of a plastic bottle as a plastic bottle along with the description of the plastic bottle including the size, dimensions, and/or capacity.

By training the artificial intelligence model using the filtered data in a standard format, the artificial intelligence model will be able to detect the type of the waste that is being collected in the waste collection devices 12(1)-12(*n*) when the cameras 21(1)-21(*n*) within the waste collection devices 12(1)-12(*n*) captures one or more images of the waste that is being collected without requiring user intervention.

Further in step 325, the waste management apparats 14 stores the trained artificial intelligence model within the memory 20, although the trained artificial intelligence model can be stored at other memory locations and the exemplary method ends at step 330.

Figure 5:
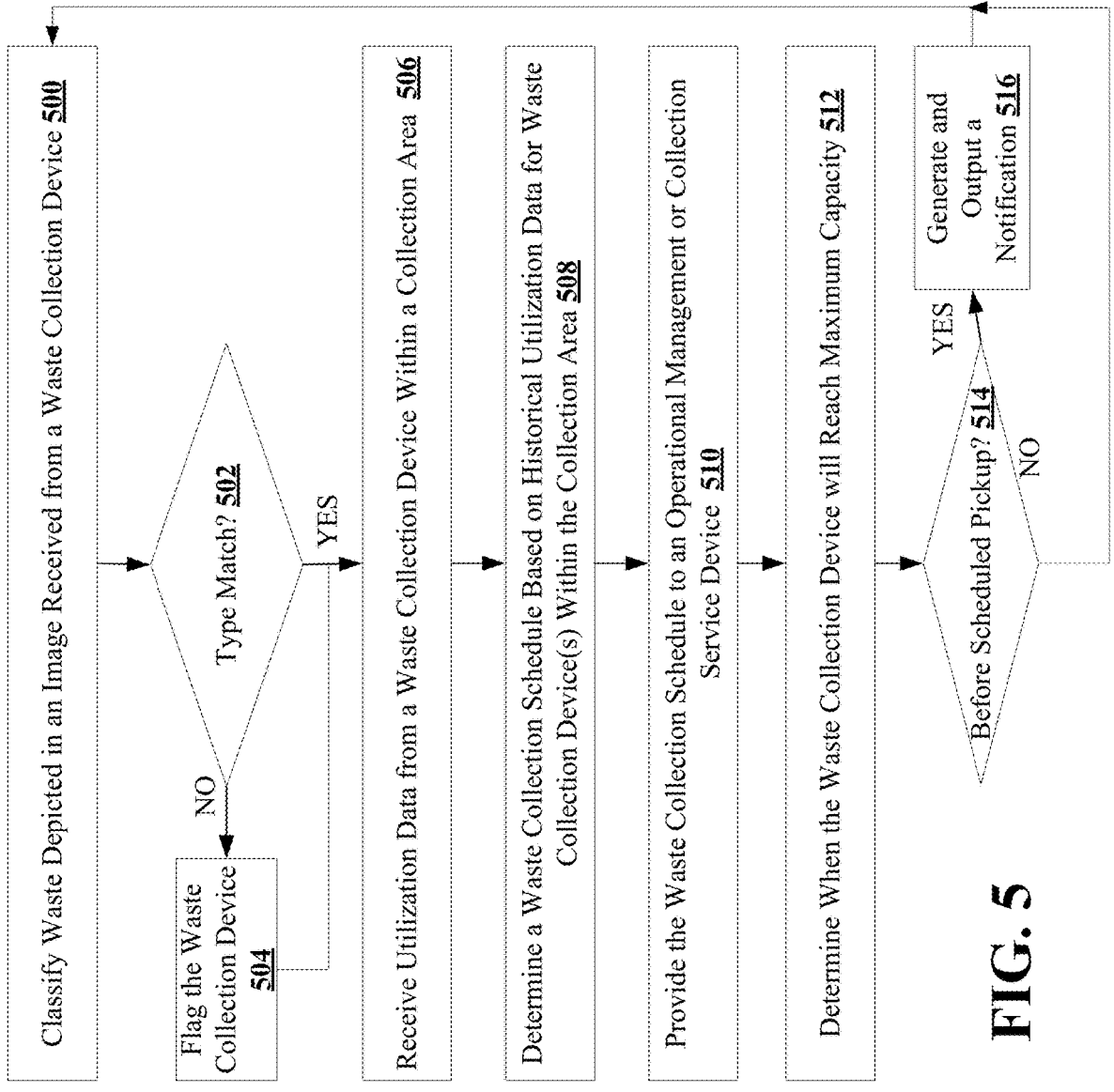
FIG. 5 is a flowchart of an exemplary method for providing artificial intelligence based waste management and improved waste collection scheduling.

Next, an exemplary method of providing artificial intelligence based waste management and improved waste collection scheduling will now be described with reference to FIG. 5. An exemplary method begins at step 500 where the waste management apparatus 14 receives an image from one of the waste collection devices 12(1)-12(n) and classifies waste depicted in the received image. In this example, the image is captured using one of the camera 23(1)-23(n) within the waste collection devices 12(1)-12(n) when waste is received.

As part of the classification, the waste management apparatus 14 identifies the type of the waste that was received by the one of the waste collection devices 12(1)-12(n) using the stored trained artificial intelligence model and the image that is received in step 500. In this example, the waste management apparatus 14 scans the received image and by applying the trained artificial intelligence model, accurately identifies the type of the waste. By way of example, the type of waste can include dry waste such as water bottle, cans, cardboard, cups, or wet waste such as food waste, although waste captured in the received image can be of other types.

In step 502, the waste management apparatus 14 determines whether a type of the waste matches a collection type that is appropriate for the one of the waste collection devices 12(1)-12(n). The waste types appropriate for each of the waste collection devices 12(1)-12(n) can be maintained in a database in the memory 20, for example. In one example, the collection type can be recyclable and the corresponding appropriate waste types can be relatively broad, such as paper, plastic, glass, or cardboard, for example. In other examples, the waste types can be relatively specific and correlate with collection types that correspond with particular recycling plants (e.g., pyrolysis energy plants). Other types of waste and/or collection types can also be used in other examples. If the waste management apparatus 14 determines that the waste type does not match (i.e., correlate with or fall within a category of) the collection type, then the No branch is taken to step 504.

In step 504, the waste management apparatus 14 flags the one of the waste collection devices 12(1)-12(n). The one of the waste collection devices 12(1)-12(n) can be flagged in a database in the memory 20, for example, to facilitate an indication on an output graphical user interface (GUI), for example, that the one of the waste collection devices 12(1)-12(n) should be collected with a different route or the associated waste should be deposited in a different location (e.g., with garbage as opposed to recyclable materials).

Optionally, the flagging can include an output notification by the one of the waste collection devices 12(1)-12(n) (e.g., illumination of an attached red light emitting diode) and/or a network message to one of the operational management devices 16(1)-16(n), for example. In other examples, the classification and/or one or more of steps 500-504 can occur at the one of the waste collection devices 12(1)-12(n) instead of at the waste management apparatus 14, and other permutations can also be used. Subsequent to flagging the one of the waste collection devices 12(1)-12(n), or if the waste management apparatus 14 determines in step 502 that the waste type matches the collection type and the Yes branch is taken, then the waste management apparatus 14 proceeds to step 506.

In step 506, the waste management apparatus 14 receives utilization data from the one of the waste collection devices 12(1)-12(n) that is within a particular collection area as preconfigured and stored in the memory 20, for example. The collection area can be a physical radius or a collection of unique identifiers for a set of the waste collection devices

12(1)-12(n), for example. The utilization data can be determined from sensor data obtained at the one of the waste collection devices 12(1)-12(n) via the volume sensors 21(1)-21(n). The utilization data is then stored in a database in the memory 20 along with other historical utilization data for the one of the waste collection devices 12(1)-12(n), which can be analyzed as explained in more detail below with reference to step 508. In some examples, the utilization data can be received periodically and/or upon every waste deposit, and other cadences can also be used in other examples.

Figure 7:
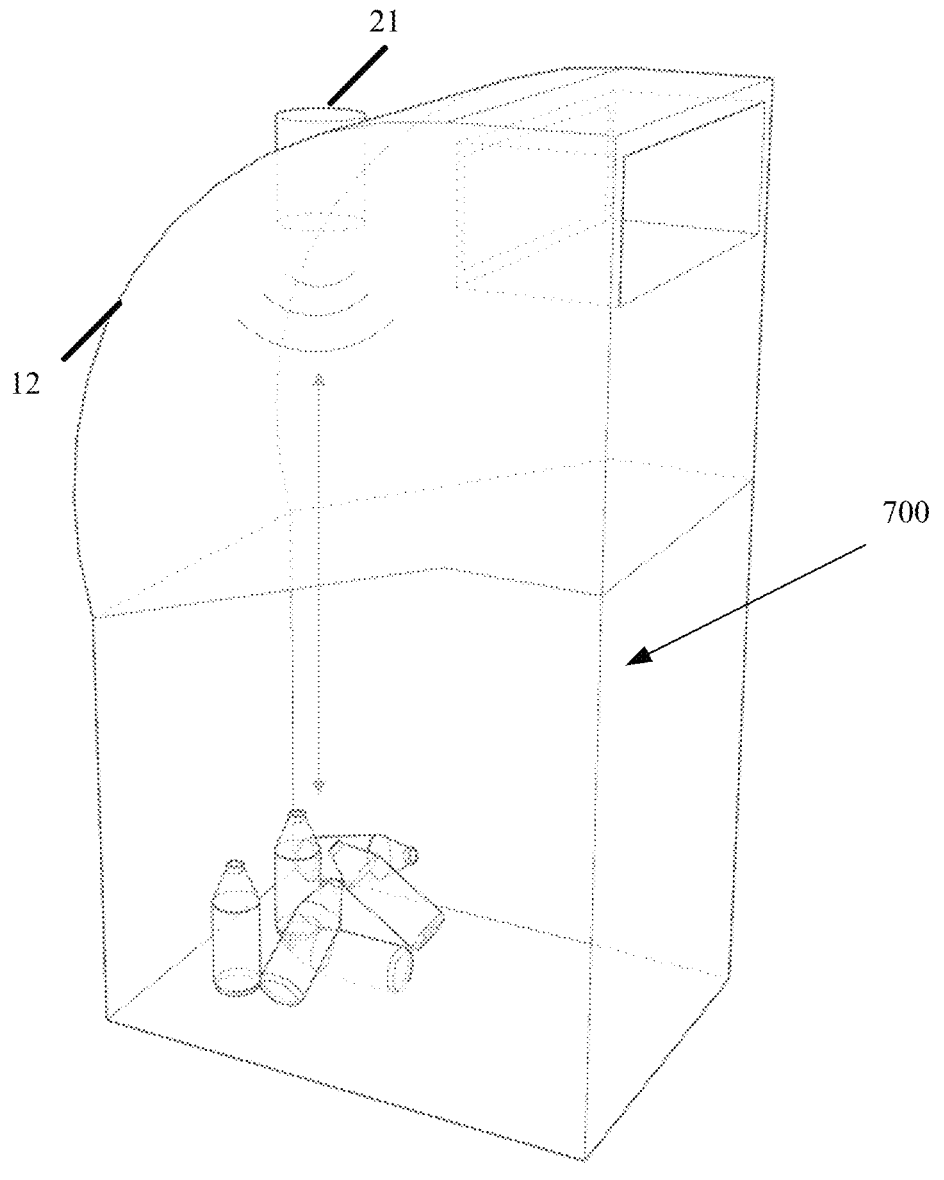
FIG. 7 is a block diagram of a waste collection device with a collection bin containing waste and a volume sensor for measuring the waste.

Referring to FIG. 7, a block diagram of a waste collection device 12 with a collection bin 700 containing waste and a volume sensor 21 for measuring the waste is illustrated. In one example, the volume sensor 21 is an ultrasonic sensor that emits light and measure the distance to the waste in the collection bin 700 based on the rate at which the light is reflected from that waste. The sensor data corresponding to the distance can be compared to the known height of the collection bin 700 in order to determine the utilization data, which can be a percentage utilization for the collection bin 700, for example. Other types of sensors and/or methods for determining the utilization data can also be used in other examples.

Referring back to FIG. 5, in step 508 the waste management apparatus 14 determines a waste collection schedule based on historical utilization data for the one of the waste collection devices 12(1)-12(n) and one or more other of the waste collection devices 12(1)-12(n) that are within a same collection area. The waste collection schedule in this example can include a physical route at which collection should occur within the collection area and/or the time and/or frequency with which each of the route(s) should be employed to collect waste, and other types of schedules can also be used in other examples.

Figure 8:
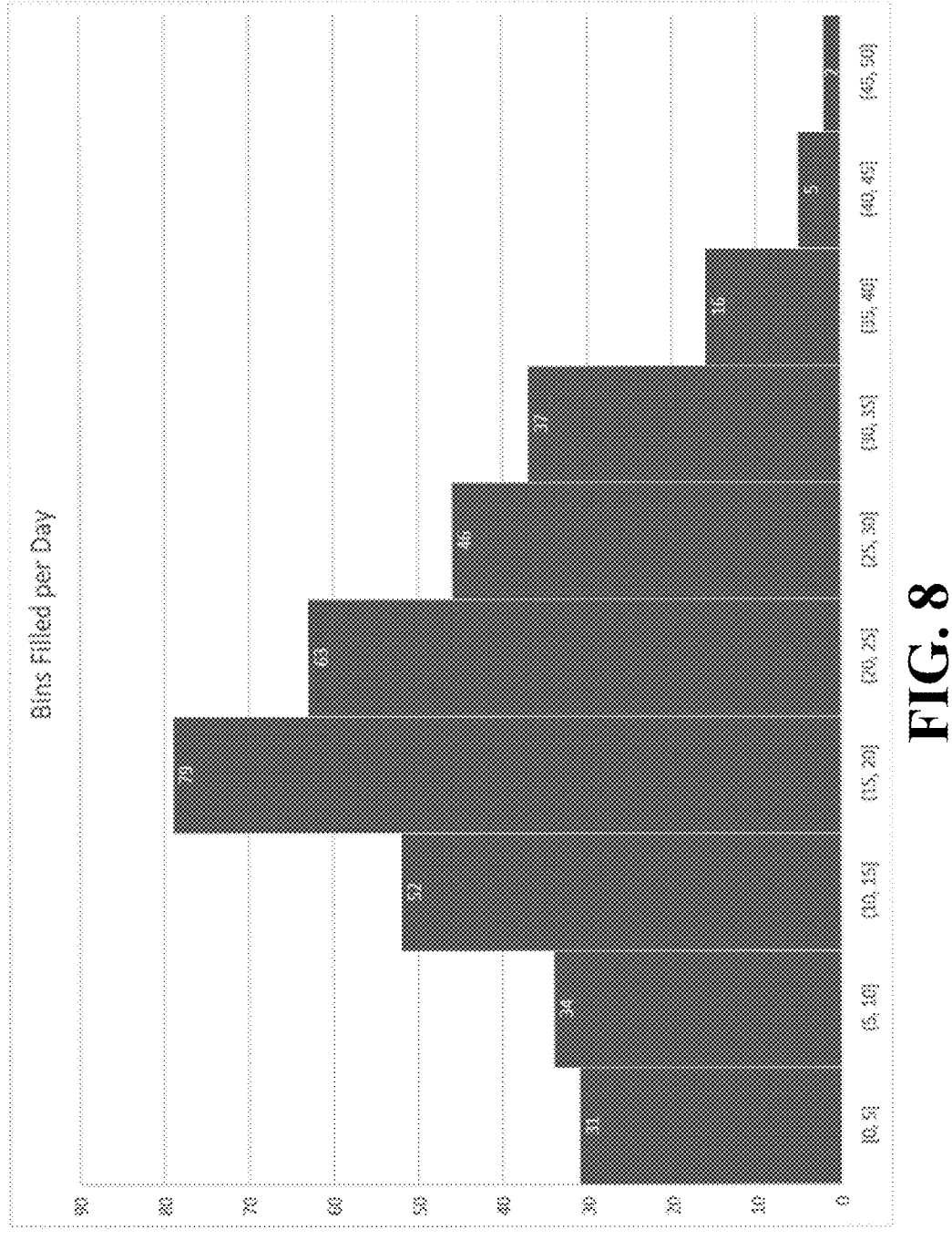
FIG. 8 is histogram of collection bin utilization for a historical one year period for a waste collection device.

Referring to FIG. 8, a histogram of collection bin utilization for a historical one year period for one of the waste collection devices 12(1)-12(n) is illustrated. In this example, the collection bin for the one of the waste collection devices 12(1)-12(n) is filled 15-20 times per day 79 days per year either on average or over the trailing one year period, for example. The distribution of bin filling allows the waste management apparatus 14 to determine a frequency of collection that advantageously smooths out the curve of reactive pickup schedules so that waste remediation entities have fewer workers and equipment on call to handle swings in volume throughout a particular time period (e.g., per month).

In some examples, the waste collection schedule is optimally generated to prevent overflow of any of the waste collection devices 12(1)-12(n) and to reduce the travel time required to sufficiently collect the waste from the waste collection devices 12(1)-12(n). In some examples, the optimal route can be based on a floorplan or layout of a facility or other environment, which identifies the location of the waste collection devices 12(1)-12(n) and/or current location of a waste collector (e.g., determined via global positioning system (GPS) tracking). In other examples, the waste management apparatus 14 can generate and provide a schedule of waste collection based on the waste collection devices 12(1)-12(n) that have reached capacity or are expected to reach capacity within the time period determined in step 512, which is separate from any particular route. Other factors can also be used to generate the waste collection schedule in other examples Referring back to FIG. 5, in step 510 the waste management apparatus 14 provides the waste collection schedule generated in step 508 to one or more of the operational management devices 16(1)-16(n) and/or the collection service device 19, for example. The waste collection schedule can be provided via a GUI requested by a user of one of those devices, for example, although other methods of providing the waste collection schedule can also be used in other examples. The waste collection schedule can be provided a predefined time period prior to a predicted time at which a route should be employed to collect waste, upon request from a user of one or more of the operational management devices 16(1)-16(n) and/or the collection service device 19, and/or at other times and in other manners.

In step 512, the waste management apparatus 14 determines when the one of the waste collection devices 12(1)-12(n) will reached the maximum capacity to collect the waste. In this example, each of the waste collection devices 12(1)-12(n) includes sensors 21(1)-21(n) that identifies the amount of waste that is currently present within the waste collection devices 12(1)-12(n). Accordingly, when the current capacity of the waste collection devices 12(1)-12(n) is above a threshold level (illustrated in FIG. 6), then one of the sensors 21(1)-21(n) within that corresponding one of the waste collection device 12(1)-12(n) sends a notification to the waste management apparatus 14.

In this example, using the notification, the waste management apparatus 14 determines that the capacity to receive the waste for that particular one of the waste collection devices 12(1)-12(n) has exceeded the threshold. Alternatively, when the current capacity of the waste collection devices 12(1)-12(n) is below a threshold level (illustrated in FIG. 6), the waste management apparatus 14 can predict when the one of the waste collection devices 12(1)-12(n) will reach a stored maximum capacity based on stored historical utilization data. Other methods for predicting, determining, and/or analyzing the utilization of the one of the waste collection devices 12(1)-12(n) can also be used in other examples.

In step 514, the waste management apparatus 14 determines whether the maximum capacity has been reached or is predicted to be reached before the waste collection from the one of the waste collection devices 12(1)-12(n) is scheduled to occur based on the waste collection schedule determined in step 508. If the waste management apparatus 14 determines that the one of the waste collection devices 12(1)-12(n) may overflow based on reaching capacity before a scheduled pickup or collection, then the Yes branch is taken to step 516.

In step 516, the waste management apparatus 14 generates and outputs a notification indicating that the one of the waste collection devices 12(1)-12(n) either is full or is going to reach maximum capacity within a time period that is determined in step 512 (i.e., before a scheduled collection). In this example, the generated notification can include an email, a pop-up notification, or a text message sent to a user of one or more of the operational management devices 16(1)-16(n) and/or collection service device 19, for example, although other types of notifications can be generated by the waste management apparatus 14.

Optionally, the waste management apparatus 14 can also generate a GUI displaying the current capacity of any number of the waste collection devices 12(1)-12(n) based on the utilization data along with the estimated time and/or date when the one or more of the waste collection devices 12(1)-12(n) will reach a maximum capacity. Further, the generated GUI can be displayed in real-time on the operational management devices 16(1)-16(n) and/or collection service device 19, for example.

Subsequent to generating and outputting the notification in step 516, or if the waste management apparatus 14 determines that the one of the waste collection devices 12(1)-12(n) will not overflow before scheduled to be collected and the No branch is taken from step 514, then the waste management apparatus 14 proceeds back to step 500. In other examples, one or more of steps 500-516 can be performed in a different order and/or in parallel for any number of the waste collection devices 12(1)-12(n).

This technology provides a number of advantages including providing a method, non-transitory computer readable medium, and apparatus that effectively provides artificial intelligence-based waste management. The disclosed technology is able to provide smart waste management system that accurately estimates the usage of collection bins and can send timely notifications to empty them. In particular, the disclosed technology uses data received from sensors and images received from cameras installed in the waste collection devices to accurately identify the current capacity and also accurately predict the when the waste collection device will be full. Furthermore, the disclosed technology generates and provides timely notifications to the operational management devices which can assist with emptying the waste collection devices 12(1)-12(n).

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method implemented by one or more waste management apparatuses, the method comprising:

periodically receiving, via one or more first communication networks, current utilization data from one of a plurality of waste collection devices within a collection area, wherein the current utilization data is determined from sensor data obtained at the one of the plurality of waste collection devices;

determining a waste collection schedule for collection from the plurality of waste collection devices based on the current utilization data for the one of the plurality of waste collection devices, historical utilization data for the plurality of waste collection devices, and a floorplan of a facility comprising the collection area, wherein the waste collection schedule comprises a route via which collection of waste from the plurality of waste collection devices is to occur and one or more of a time or a frequency with which the route is to be employed to collect waste from the plurality of waste collection devices;

predicting when a maximum capacity for the one of the plurality of waste collection devices is likely to be reached based on the current utilization data and the historical utilization data for the one of the plurality of waste collection devices, wherein the historical utilization data for the one of the plurality of waste collection devices comprises a number of times the one of the plurality of waste collection devices has been filled within a time interval over a historical time period;

determining, based on the prediction and the waste collection schedule, that the maximum capacity for the one of the plurality of waste collection devices is likely to be reached before collection from the one of the plurality of waste collection devices is scheduled, wherein the waste collection devices comprise collection bins having a fixed location; and outputting a first alert via one or more second communication networks to an operational management device or a collection service device to prevent overflow of the one of the plurality of waste collection devices.

2. The method as set forth in claim 1, further comprising:

receiving an image from the one of the plurality of waste collection devices, wherein the image depicts at least waste deposited into the one of the plurality of waste collection devices;

executing an artificial intelligence model to classify the deposited waste;

determining that the deposited waste is of an incorrect type for the one of the plurality of waste collection devices based on the classification and a stored collection type for the one of the plurality of waste collection devices; and outputting a second alert via the one or more second communication networks to the operational management device or the collection service device.

3. The method as set forth in claim 1, wherein the sensor data is obtained at the one of the plurality of waste collection devices via an ultrasonic sensor, the sensor data comprises an indication of a height of a collection of waste disposed within a collection bin of the one of the plurality of waste collection devices, and the current utilization data comprises a percentage utilization of the collection bin based on the height.

4. The method as set forth in claim 1, further comprising generating a graphical user interface comprising a current capacity of the one of the plurality of waste collection devices in real-time and providing the graphical user interface via the one or more second communication networks to the operational management device or the collection service device.

5. The method as set forth in claim 2, further comprising:

obtaining training data comprising a plurality of filtered images of different types of waste and corresponding waste types; and training the artificial intelligence model using the training data.

6. The method as set forth in claim 1, further comprising providing the waste collection schedule via the one or more second communication networks to the operational management device or the collection service device.

7. A non-transitory computer readable medium having stored thereon instructions comprising executable code that, when executed by at least one processor, causes the processor to:

periodically receive, via one or more first communication networks, current utilization data from one of a plurality of waste collection devices within a collection area, wherein the current utilization data is determined from sensor data obtained at the one of the plurality of waste collection devices;

determine a waste collection schedule for collection from the plurality of waste collection devices based on the current utilization data for the one of the plurality of waste collection devices, historical utilization data for the plurality of waste collection devices, and a floorplan of a facility comprising the collection area, wherein the waste collection schedule comprises a route via which collection of waste from the plurality of waste collection devices is to occur and one or more of a time or a frequency with which the route is to be employed to collect waste from the plurality of waste collection devices;

predict when a maximum capacity for the one of the plurality of waste collection devices is likely to be reached based on the current utilization data and the historical utilization data for the one of the plurality of waste collection devices, wherein the historical utilization data for the one of the plurality of waste collection devices comprises a number of times the one of the plurality of waste collection devices has been filled within a time interval over a historical time period;

determine, based on the prediction and the waste collection schedule, that the maximum capacity for the one of the plurality of waste collection devices is likely to be reached before collection from the one of the plurality of waste collection devices is scheduled, wherein the waste collection devices comprise collection bins having a fixed location; and output a first alert via one or more second communication networks to an operational management device or a collection service device to prevent overflow of the one of the plurality of waste collection devices.

8. The non-transitory computer readable medium as set forth in claim 7, wherein the executable code, when executed by the processor, further causes the processor to:

receive an image from the one of the plurality of waste collection devices, wherein the image depicts at least waste deposited into the one of the plurality of waste collection devices;

execute an artificial intelligence model to classify the deposited waste;

determine that the deposited waste is of an incorrect type for the one of the plurality of waste collection devices based on the classification and a stored collection type for the one of the plurality of waste collection devices; and output a second alert via the one or more second communication networks to the operational management device or the collection service device.

9. The non-transitory computer readable medium as set forth in claim 7, wherein the sensor data is obtained at the one of the plurality of waste collection devices via an ultrasonic sensor, the sensor data comprises an indication of a height of a collection of waste disposed within a collection bin of the one of the plurality of waste collection devices, and the current utilization data comprises a percentage utilization of the collection bin based on the height.

10. The non-transitory computer readable medium as set forth in claim 7, wherein the executable code, when executed by the processor further causes the processor to generate a graphical user interface comprising a current capacity of the one of the plurality of waste collection devices in real-time and providing the graphical user interface via the one or more second communication networks to the operational management device or the collection service device.

11. The non-transitory computer readable medium as set forth in claim 8, wherein the executable code, when executed by the processor further causes the processor to:

obtain training data comprising a plurality of filtered images of different types of waste and corresponding waste types; and train the artificial intelligence model using the training data.

12. The non-transitory computer readable medium as set forth in claim 7, wherein the executable code, when executed by the processor further causes the processor to provide the waste collection schedule via the one or more second communication networks to the operational management device or the collection service device.

13. A waste management apparatus, comprising:

a memory having programmed instructions stored thereon; and one or more processors coupled to the memory and configured to execute the stored programmed instructions to:

periodically receive, via one or more first communication networks, current utilization data from one of a plurality of waste collection devices within a collection area, wherein the current utilization data is determined from sensor data obtained at the one of the plurality of waste collection devices;

determine a waste collection schedule for collection from the plurality of waste collection devices based on the current utilization data for the one of the plurality of waste collection devices, historical utilization data for the plurality of waste collection devices, and a floorplan of a facility comprising the collection area, wherein the waste collection schedule comprises a route via which collection of waste from the plurality of waste collection devices is to occur and one or more of a time or a frequency with which the route is to be employed to collect waste from the plurality of waste collection devices;

predict when a maximum capacity for the one of the plurality of waste collection devices is likely to be reached based on the current utilization data and the historical utilization data for the one of the plurality of waste collection devices, wherein the historical utilization data for the one of the plurality of waste collection devices comprises a number of times the one of the plurality of waste collection devices has been filled within a time interval over a historical time period;

determine, based on the prediction and the waste collection schedule, that the maximum capacity for the one of the plurality of waste collection devices is likely to be reached before collection from the one of the plurality of waste collection devices is scheduled, wherein the waste collection devices comprise collection bins having a fixed location; and output a first alert via one or more second communication networks to an operational management device or a collection service device to prevent overflow of the one of the plurality of waste collection devices.

14. The waste management apparatus as set forth in claim 13, wherein the one or more processors are further configured to execute the stored programmed instructions to:

receive an image from the one of the plurality of waste collection devices, wherein the image depicts at least waste deposited into the one of the plurality of waste collection devices;

execute an artificial intelligence model to classify the deposited waste;

determine that the deposited waste is of an incorrect type for the one of the plurality of waste collection devices based on the classification and a stored collection type for the one of the plurality of waste collection devices; and output a second alert via the one or more second communication networks to the operational management device or the collection service device.

15. The waste management apparatus as set forth in claim 13, wherein the sensor data is obtained at the one of the plurality of waste collection devices via an ultrasonic sensor, the sensor data comprises an indication of a height of a collection of waste disposed within a collection bin of the one of the plurality of waste collection devices, and the current utilization data comprises a percentage utilization of the collection bin based on the height.

16. The waste management apparatus as set forth in claim 13, wherein the one or more processors are further configured to execute the stored programmed instructions to generate a graphical user interface comprising a current capacity of the one of the plurality of waste collection devices in real-time and providing the graphical user interface via the one or more second communication networks to the operational management device or the collection service device.

17. The waste management apparatus as set forth in claim 14, wherein the one or more processors are further configured to execute the stored programmed instructions to:

obtain training data comprising a plurality of filtered images of different types of waste and corresponding waste types; and train the artificial intelligence model using the training data.

18. The waste management apparatus as set forth in claim 13, wherein the one or more processors are further configured to execute the stored programmed instructions to provide the waste collection schedule via the one or more second communication networks to the operational management device or the collection service device.

* * * * *